(12) United States Patent
Eriksen

(10) Patent No.: US 7,104,280 B2
(45) Date of Patent: Sep. 12, 2006

(54) MIXING FAUCET WITH A SWIVEL TAP

(75) Inventor: Torben Eriksen, Vissenbjerg (DK)

(73) Assignee: Damiza A/S, (DK)

( * ) Notice: Subject to any disclaimer, the term of this patent is extended or adjusted under 35 U.S.C. 154(b) by 73 days.

(21) Appl. No.: 10/660,391

(22) Filed: Sep. 11, 2003

(65) Prior Publication Data

US 2005/0056324 A1   Mar. 17, 2005

(51) Int. Cl.
  *F16K 11/20* (2006.01)
  *F16K 31/60* (2006.01)

(52) U.S. Cl. .................. 137/606; 137/615; 251/233
(58) Field of Classification Search ............. 137/606, 137/615; 251/233, 250
  See application file for complete search history.

(56) References Cited

U.S. PATENT DOCUMENTS

| 4,429,712 A | * | 2/1984 | MacDonald | 137/606 |
| 4,499,918 A | * | 2/1985 | Jong | 137/606 |
| 4,592,388 A | * | 6/1986 | Wilcox | 137/801 |
| 4,815,703 A | * | 3/1989 | Antoniello | 251/251 |
| 6,021,811 A | * | 2/2000 | Hennessy | 137/606 |

* cited by examiner

*Primary Examiner*—Stephen M. Hepperle
(74) *Attorney, Agent, or Firm*—Kwadjo Adusei-Poku; Lloyd D. Doigan

(57) ABSTRACT

A mixing faucet includes a body part (2), where a rotatable swivel tap (4) is mounted on said body part and a rotatable valve spindle (6) is mounted in said body part for an adjustment of the feeding of cold and hot water, respectively. The rotatable valve spindle (6) is according to the utility model equipped with a projecting arm (8) engaging a groove in a slide (10) on the side of the body part (2). The resulting mixing faucet is much easier to handle than hitherto known.

8 Claims, 5 Drawing Sheets

MIXING FAUCET WITH A SWIVEL TAP

TECHNICAL FIELD

The present utility model deals with a mixing faucet including a body part, where a rotatable swivel tap is mounted on said body part and a rotatable valve spindle is mounted in said body part for an adjustment of the feeding of cold water and a rotatable valve spindle for the adjustment of the feeding of hot water.

BACKGROUND ART

Mixing faucets are known which include a rotary handle for activating the rotatable valve spindles for the adjustment of the feeding of cold and hot water, respectively.

However, such rotary handles should be avoided for the sake of the design.

DISCLOSURE OF INVENTION

The object of the utility model is to provide a mixing faucet allowing the adjustment of the feeding of the cold and the hot water, respectively, to be carried out by means of a slide.

The new features of the utility model are found in each rotatable valve spindle being equipped with a projecting arm engaging a slide which is arranged on the side of the body part of the mixing faucet.

As a result, a mixing faucet with a flat look is obtained, said mixing faucet also being more suited for handicapped persons than hitherto known.

According to a particular embodiment, a projecting member is provided on the body part, the slide being displaceable on said projecting member.

A sleeve may, if desired, be provided at the end of the projecting member, and a bar connected to the slide can be displaced in said sleeve with the result that said slide is prevented from wriggling.

BRIEF DESCRIPTION OF THE DRAWINGS

The invention is explained in detail below with reference to the drawings, in which.

BEST MODE FOR CARRYING OUT THE INVENTION

Figure 1:
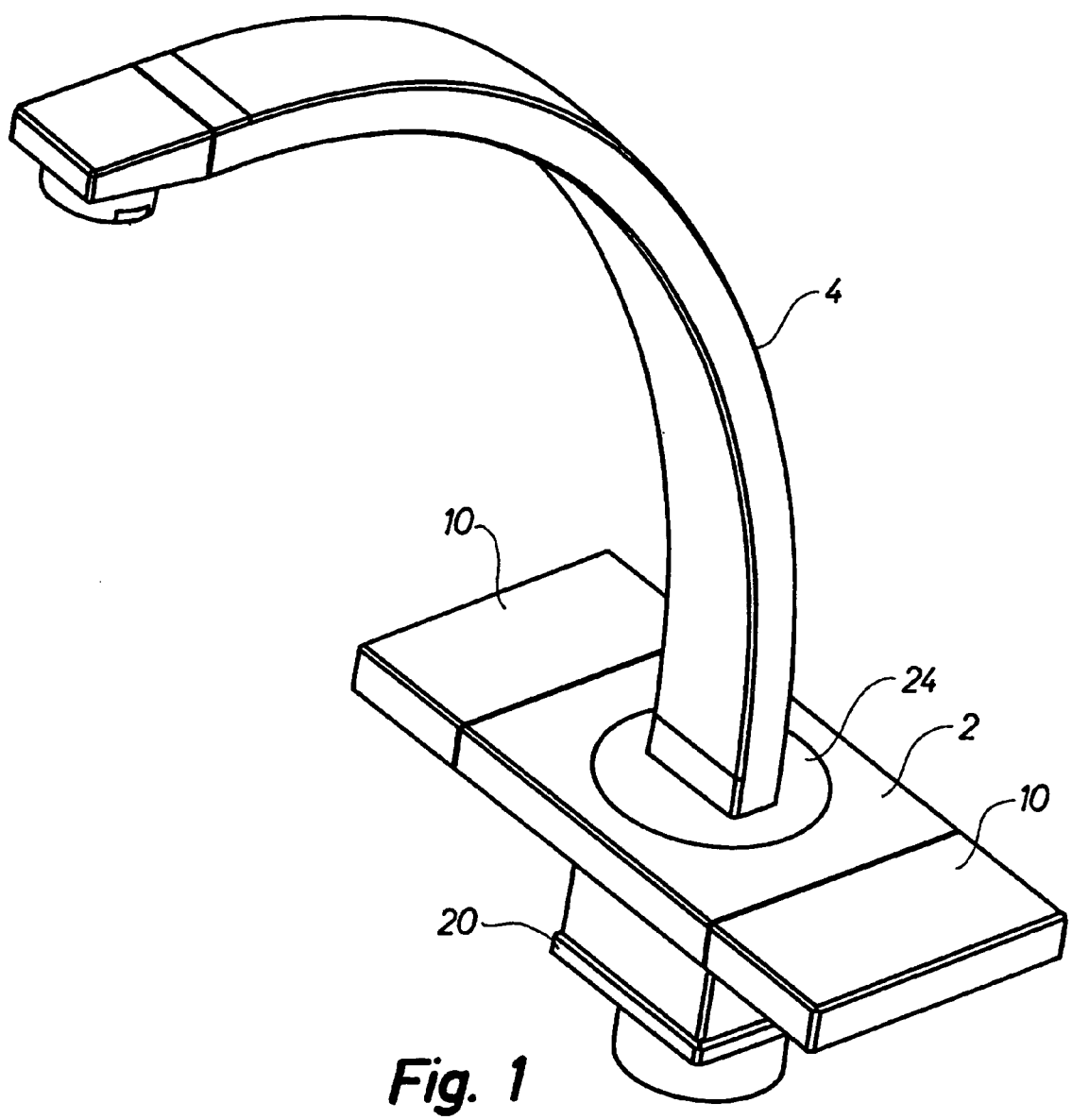
FIG. 1 shows a mixing faucet according to the utility model, said mixing faucet including a body part with a swivel tap and an adjusting slide on both sides of said body part.
Figure 2:
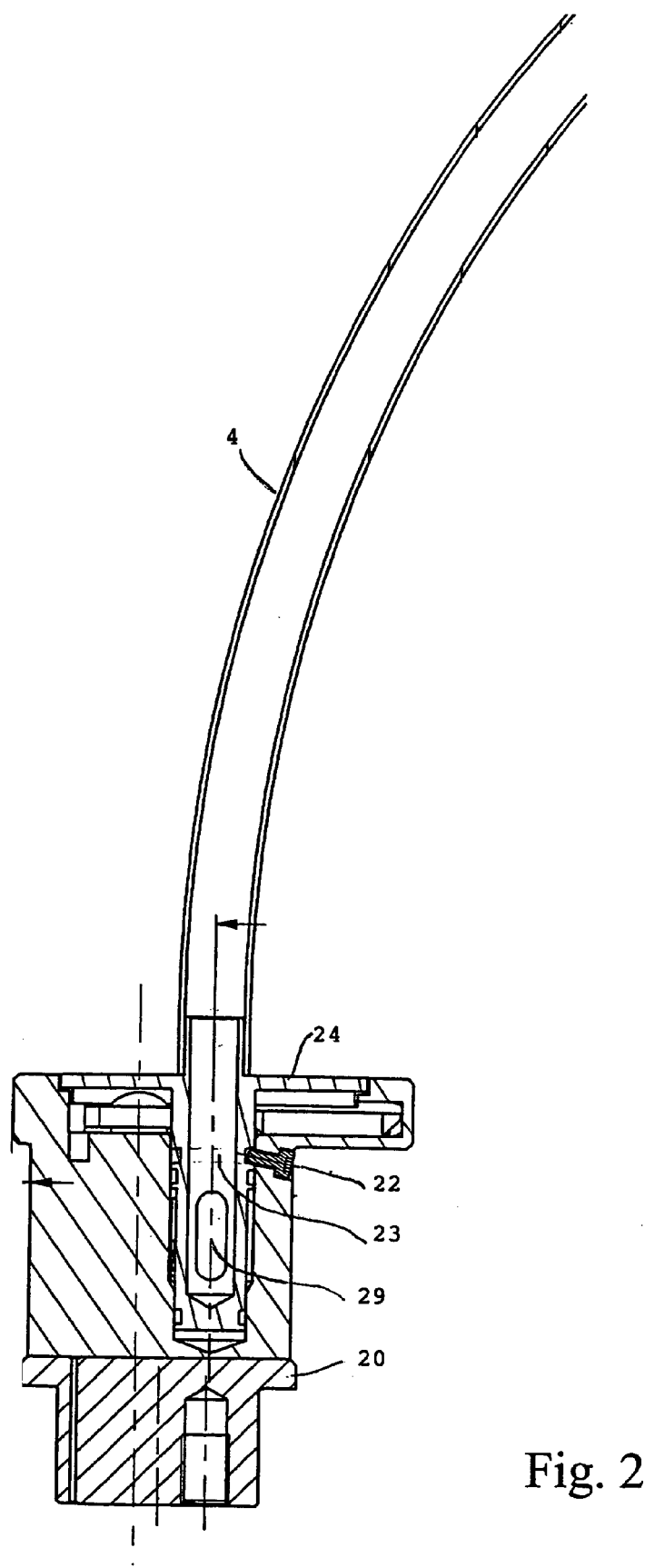
FIG. 2 is a sectional view of the mixing faucet of FIG. 1, and showing how the rotatable swivel tap is secured to the body part.
Figure 4:
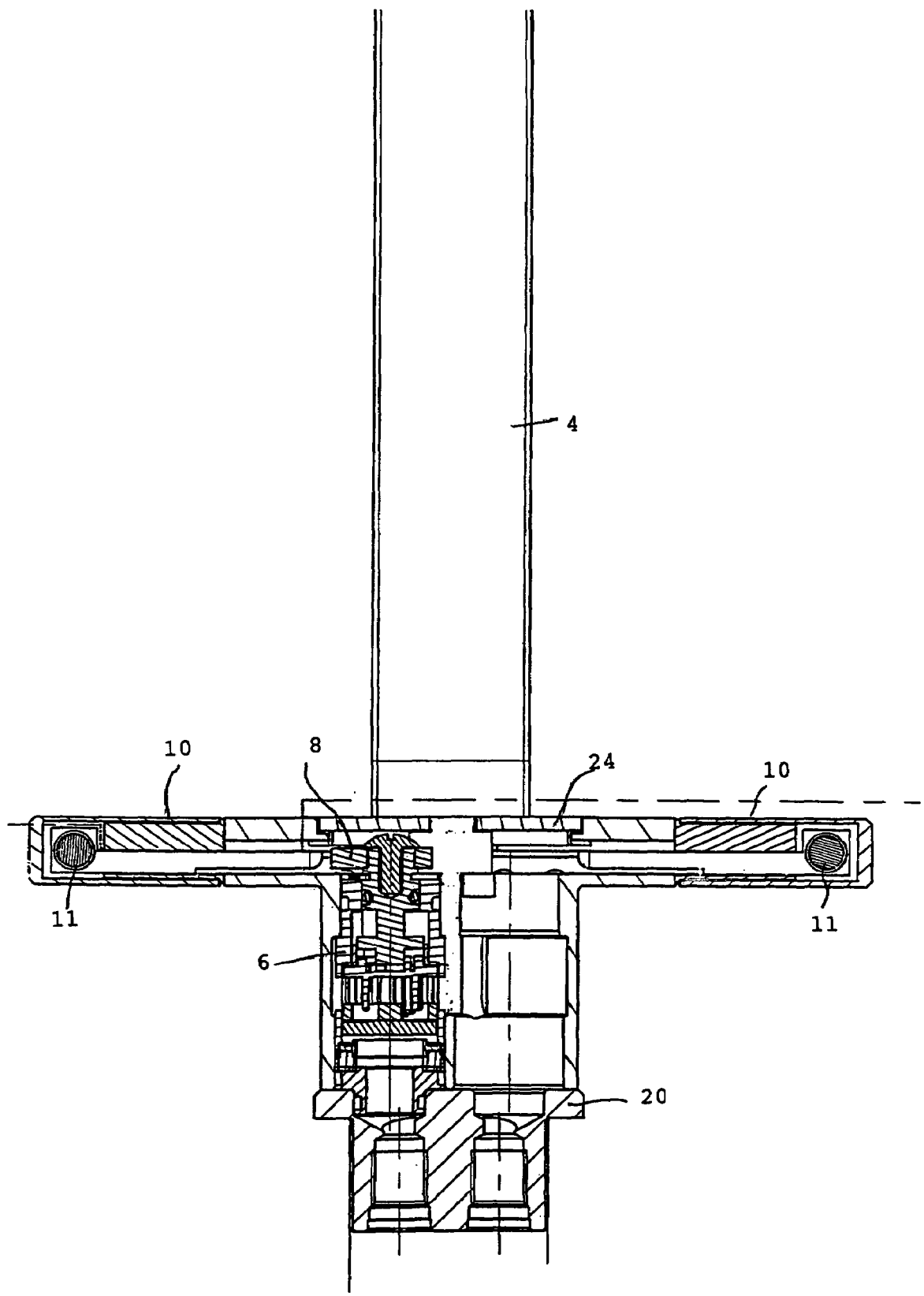
FIG. 4 is a sectional front view of the mixing faucet of FIG. 1.
Figure 5:
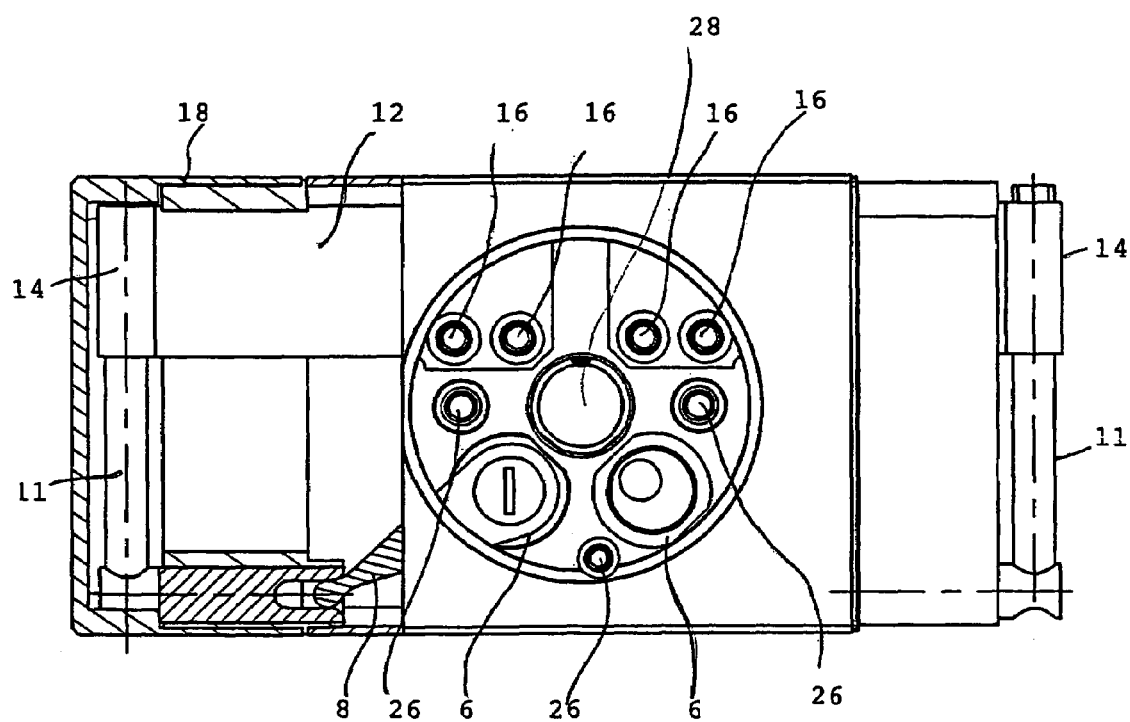
FIG. 5 is a top view of the mixing faucet of FIG. 1 where the swivel tap has been dismounted.

The mixing faucet of FIG. 1 according to the utility model includes a body part 2 and a rotatable swivel tap 4 mounted on said body part 2. As shown in FIGS. 4 and 5, a rotatable valve spindle 6 is mounted on the body part 2, said valve spindle being adapted to adjust the feeding of cold water, in addition to a valve spindle adapted to adjust the feeding of hot water. In order to achieve the flat look shown in FIG. 1, each valve spindle 6 is equipped with a projecting arm 8, cf. FIG. 5. The valve spindle 6 extends through a side opening in the body part 2 and engages a slide 10 movable on the side of said body part 2 and flushing with the plane upper face of said body part 2. Each slide 10 is provided with an elongated opening, and a projecting member 12 is secured to the body part 2 and extends through said elongated opening in the slide 10 in such a manner that said slide 10 can be moved forwards and backwards. An expanded portion is found at the end of the projecting member 12, said expanded portion being in form of a sleeve 14 allowing a bar 12 secured to the slide 10 to be displaced therein so as to prevent the slide 10 from wriggling. Like the slide 10, the projecting member 12 is preferably made of brass.

The slide 10 is surrounded by a cover structure hiding the slide mechanism. It should be noted that the slide mechanism can be structured in other ways, such as by means of a rack work mechanism or an articulated rod mechanism.

The projecting members 12 are secured to the body part 2 by means of screws 16 on a countersunk portion of the body part 2. This countersunk portion is covered by a cover member.

The body part 2 is furthermore provided with cavities allowing insertion of the valve spindles 6, preferably from the bottom, with the result that a bottom section 20 can be screwed thereon, cf. FIGS. 4 and 5, by means of through screws 26 shown in the countersunk portion of the body part 2. In addition, the projecting arms 8 can be screwed onto the upper portion of the valve spindles 6, said projecting arms 8 extending through side openings in the body part 2 so as to engage slots in the movable slides 10. The valve spindles 6 are furthermore structured such that they can only be inserted while they are in a specific angular position relative to the cavities in the body part 2, and furthermore such that the change from open into a closed position only requires a turning of approximately 90°. The mixing faucet according to the utility model is highly advantageous in requiring nothing but ordinary valve spindles.

When the projecting arms 8 are secured to the valve spindles 6 by means of a screw in the countersunk portion of the body part 2, the swivel tap 4 is moved downwards into a central opening 28 in the countersunk portion of the body part 2. The swivel tap is moved so far downwards into the opening 28 that it cannot wriggle. The swivel tap 4 includes a circumferential groove 23 with the result that it can be retained by means of a holding screw 22 inserted into said groove 23 at the same time as it is rotatably arranged. A circular cover member 24 is secured to the swivel tap 4, said cover member 24 covering the relatively large opening to the countersunk portion of the body part 2 and consequently all the securing screws. The cover member 4 rotates together with the swivel tap 4 and has been sealed by means of a durable plastic gasket.

Figure 3:
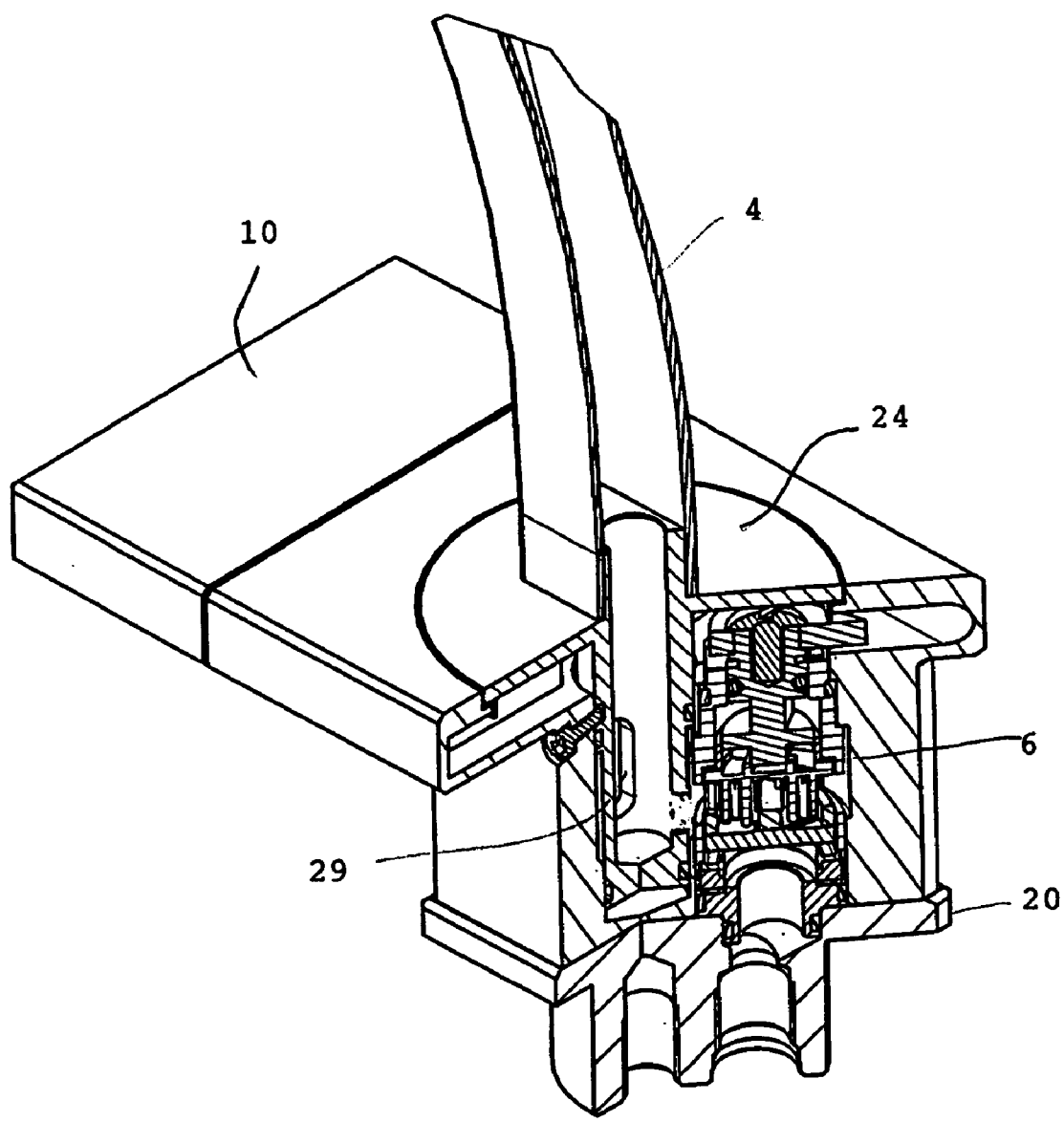
FIG. 3 shows the mixing faucet of FIG. 1 where some parts have been removed with the result that a sectional view is shown of one of the rotatable valve spindles in the body part for adjustment of the feeding of either cold or hot water.

FIG. 3 shows some side openings 29 in the portion of the swivel tap 4 being inserted in the body part 2. These side openings 29 communicate with a circumferential cavity surrounding the swivel tap 4, said cavity in turn communicating with the outlet openings of the valve spindles.

The entire mixing faucet can for instance be secured to a table-top by means of a bench screw at the bottom.

The invention claimed is:

1. A mixing faucet comprising:
    a faucet body having a top surface, a bottom surface and left and right side surfaces;
    a faucet spout attached to the faucet body, the faucet spout being rotatable about a vertical axis and extending upwards from the faucet body;
    a plurality of valve spindles contained within the faucet body and extending downwards therefrom, each valve spindle being used to control the amount of fluid through the valve spindle and flowing through the faucet spout;
    a pair of handle slides attached to the faucet body, the handle slides extending laterally from the faucet body; and
    a projecting arm attached at a first end to each valve spindle and attached at a second end to each handle slide;
    wherein, as each handle slide is moved from a first open position to a second closed position, the corresponding valve spindle is rotated from a first open position to a second closed position.

2. The mixing faucet as described in claim 1, wherein the left and right side surfaces of the faucet body are straight surfaces, and wherein the slide handles are mounted flush against the left and right side surfaces and move horizontally along the left and right side surfaces of the faucet body.

3. The mixing faucet as described in claim 2, wherein the faucet spout has an attachment end and an outlet end, and further comprising:
    a circumferential groove about the attachment end of the faucet spout, and
    an attachment screw, extending through the faucet body and engaging the faucet spout within the circumferential groove, such that the attachment screw prevents significant vertical movement of the faucet spout, but allows rotational movement of the spout.

4. The mixing faucet as described in claim 3, wherein the slide handle has a top surface and a bottom surface, and further comprising:
    a slotted opening along the bottom surface of the slide handle, the slotted opening being adapted to receive the second end of the projecting arm.

5. The mixing faucet as described in claim 4, wherein the second end of the projecting arm is rounded and sized so as to be secured within the slotted opening of the slide handle.

6. The mixing Faucet as described in claim 5, wherein each valve spindle may only be inserted in a specific angular orientation to the faucet body, such that as the handle slide attached to the valve spindle is moved from the first open position to the second closed position, the attached valve spindle is rotated through ninety (90) degrees from the first open position to the second closed position.

7. The mixing faucet as described in claim 6, wherein the faucet body contains a circular depression on its top surface around the faucet spout, and further comprising:
    a circular cover cap adapted to fit within the circular depression on the top surface of the faucet body; and
    a sealing gasket disposed beneath the circular cover cap.

8. The mixing faucet as described in claim 1, wherein a first handle slide operates a first valve spindle for controlling the cold water flow, and a second handle slide operates a second valve spindle for controlling the hot water flow, and wherein each handle slide may be operated independently of the other handle slide.

* * * * *

UNITED STATES PATENT AND TRADEMARK OFFICE
CERTIFICATE OF CORRECTION

PATENT NO.       : 7,104,280 B2
APPLICATION NO.  : 10/660391
DATED            : September 12, 2006
INVENTOR(S)      : Torben Eriksen Page 1 of 1

It is certified that error appears in the above-identified patent and that said Letters Patent is hereby corrected as shown below:

Title Page Item (73) Assignee Damiza A/S should read:

-- Damixa A/S --

Signed and Sealed this

Seventeenth Day of March, 2009

JOHN DOLL
*Acting Director of the United States Patent and Trademark Office*